US006220271B1

(12) United States Patent
Emmerich et al.

(10) Patent No.: US 6,220,271 B1
(45) Date of Patent: *Apr. 24, 2001

(54) CHECKVALVE UNIT

(75) Inventors: Ulf Emmerich, Weibenburg; Thaddäus Buratowski, Langenaltheim, both of (DE)

(73) Assignee: Alfmeier Prazision AG Baugruppen und Systemlosungen, Treuchtlingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/495,145

(22) Filed: Jan. 31, 2000

Related U.S. Application Data

(63) Continuation of application No. 09/078,198, filed on May 13, 1998, now Pat. No. 6,035,881.

(30) Foreign Application Priority Data

May 15, 1997 (DE) .............................. 197 20 283

(51) Int. Cl.[7] ...................................................... F04F 5/52
(52) U.S. Cl. .................... 137/113; 417/159; 417/188; 417/189; 417/191
(58) Field of Search .................... 137/113; 417/159, 417/188, 189, 191

(56) References Cited

U.S. PATENT DOCUMENTS

| 1,180,017 | 4/1916 | Davenport . |
| 1,845,969 | 2/1932 | Hueber . |
| 3,042,077 | 7/1962 | Waddington et al. . |
| 3,754,841 | 8/1973 | Grabb et al. . |
| 4,211,200 | 7/1980 | Rocchio et al. . |
| 4,913,192 | 4/1990 | Vavra . |
| 5,108,266 | 4/1992 | Hewitt . |
| 5,188,141 | 2/1993 | Cook et al. . |
| 5,291,916 | 3/1994 | Kloosterman et al. . |
| 6,035,881 | * 3/2000 | Emmerich et al. ................. 137/113 |

FOREIGN PATENT DOCUMENTS

| 3333566A1 | 3/1984 | (DE) . |
| 4344624A1 | 6/1994 | (DE) . |
| 4310761A1 | 10/1994 | (DE) . |

* cited by examiner

*Primary Examiner*—Stephen M. Hepperle
(74) *Attorney, Agent, or Firm*—Dority & Manning

(57) ABSTRACT

A checkvalve (1) is provided with an inlet which can be connected to an operating system requiring a negative pressure, e.g. to a braking force amplifier (17), an outlet (3) which can be connected to a negative-pressure system producing a negative pressure, a main air channel (4) connecting the inlet and the outlet in a fluid manner and enabling an air flow in the direction of the outlet, a first checkvalve (9) installed in the main air channel (4), a single outside-air channel (5) which branches off downstream of the first checkvalve (9) and lets out into the atmosphere and a cross-sectional narrowing (7) in the manner of a venturi pipe (6), a venturi channel (8) connecting the cross-sectional narrowing (7) upstream of the first checkvalve (9) to the main air channel (4) and a second valve (10) located between the inlet (2) and the cross-sectional narrowing (7) in the main air channel (4) or in the venturi channel (8). A shut-off valve is located before or after the cross-sectional narrowing (7) in the outside-air channel (5) and is actuated as a function of the system pressure ($p_s$) prevailing in the operating system in such a manner that the connection to the atmosphere is established when a predetermined target pressure ($P_{soll}$) is exceeded and is interrupted when the pressure drops below this pressure.

5 Claims, 9 Drawing Sheets

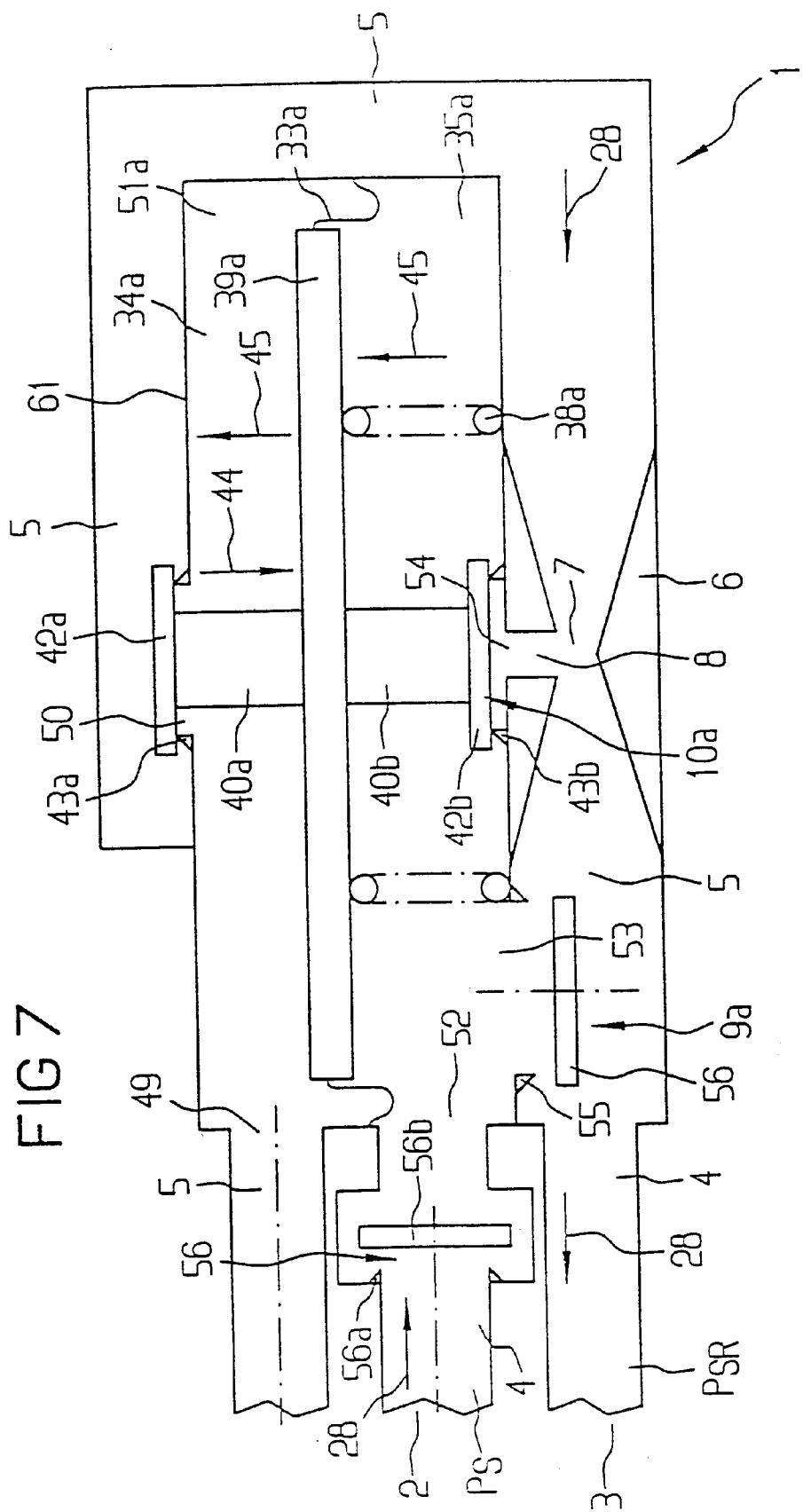

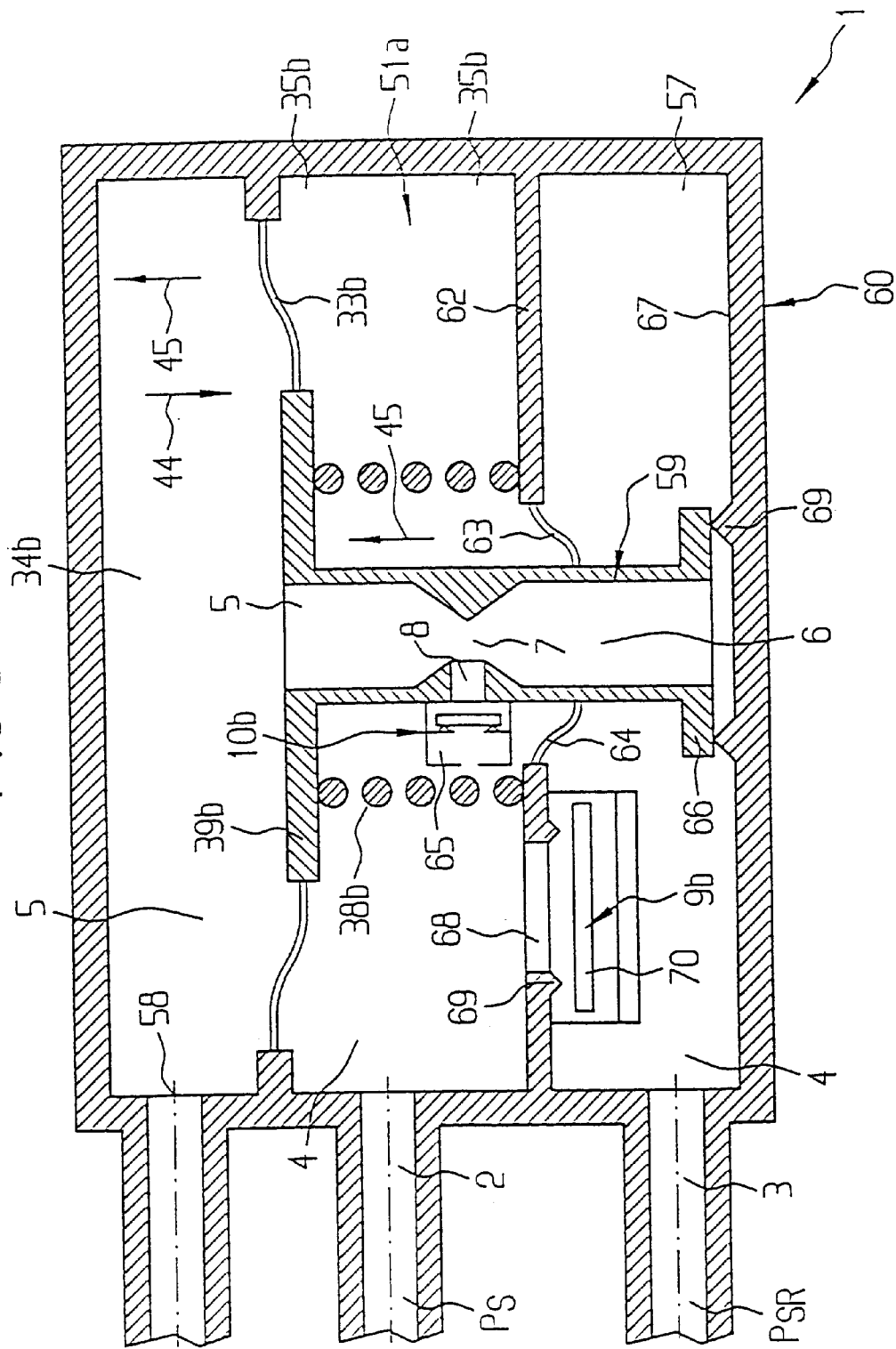

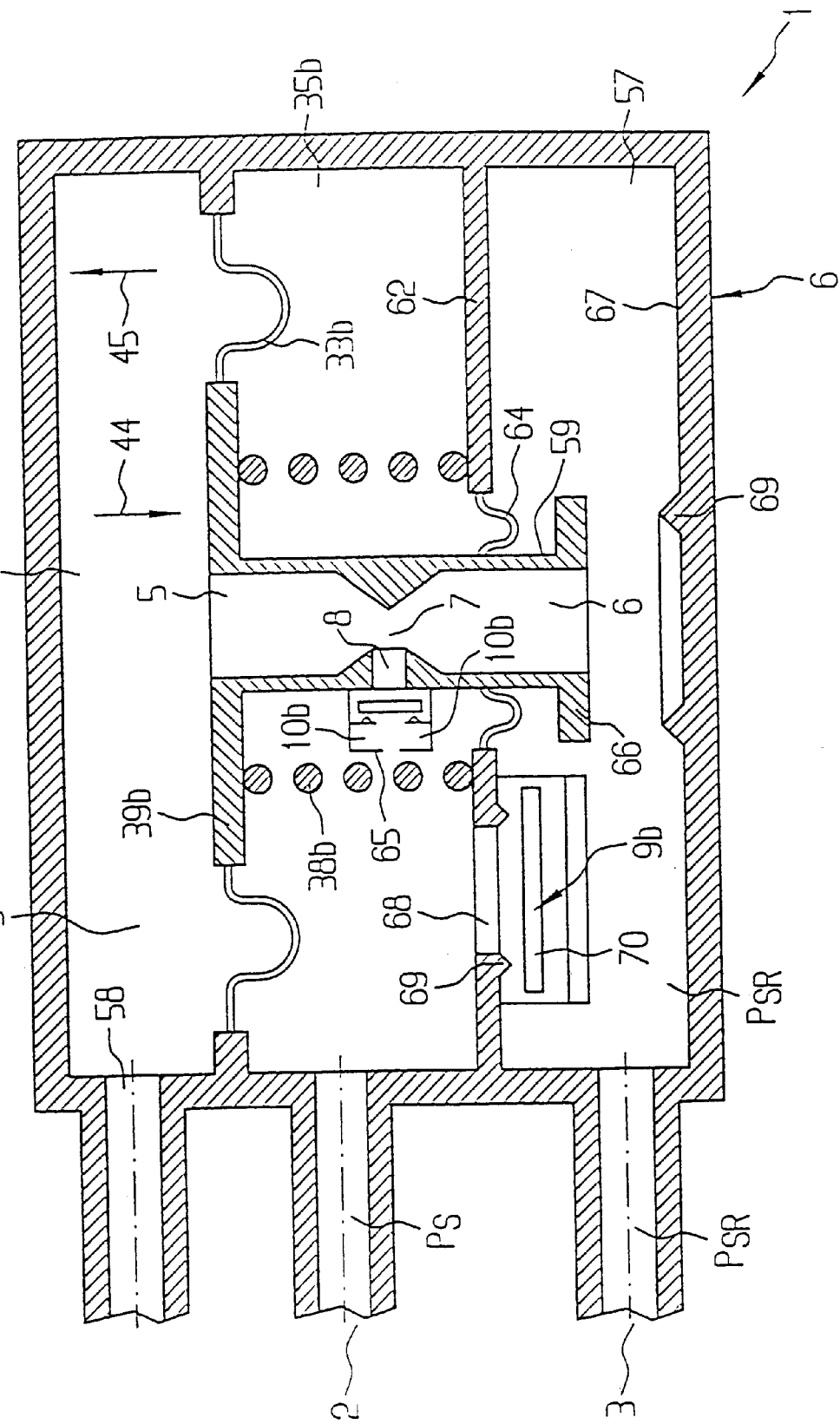

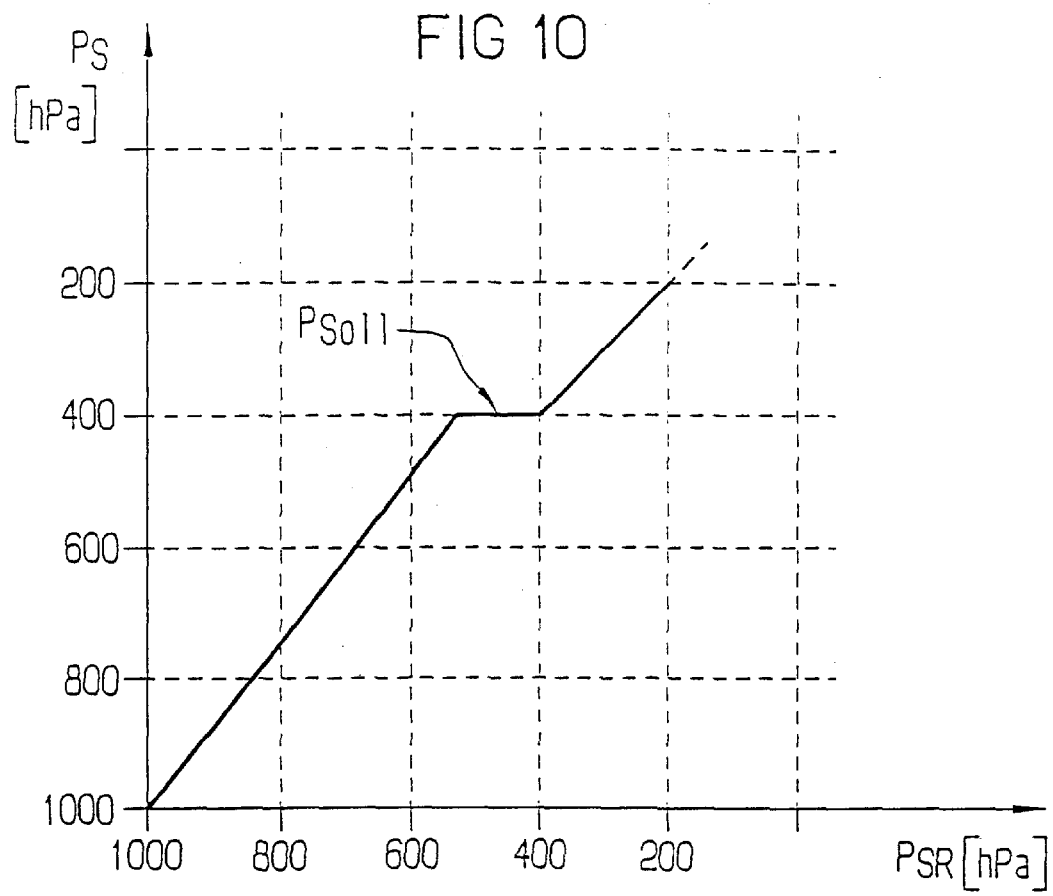
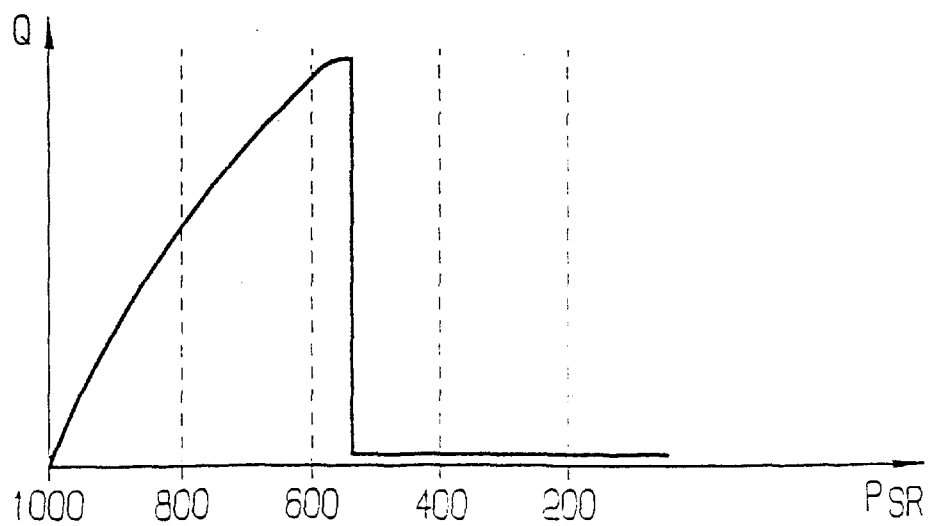

CHECKVALVE UNIT

The present application is a Continuation Application of Application Ser. No. 09/078,198, filed May 13, 1998, now U.S. Pat. No. 6,035,881.

FIELD OF THE INVENTION

The present invention relates to a checkvalve unit which is generally used to connect an operating system, e.g. the braking force amplifier of a vehicle braking system or the servomotor of the power steering system, of a vehicle requiring negative pressure to a suction system which produces negative pressure, e.g. the suction pipe or aspiration channel of a combustion engine. The checkvalve unit is to ensure that a negative pressure produced in an operating system is maintained, even when the pressure in the suction system rises or when the negativepressure production in the suction system is completely interrupted. The latter is the case for example when the vehicle engine is stopped.

A checkvalve unit comprises an inlet and an outlet connected to each other via a main air channel. In the assembled state or in case of utilization, the inlet is connected to the operating system and the outlet to the suction system. A first checkvalve is located in the main air channel. This prevents the negative pressure from escaping once it has been produced in the operating system in case that pressure rises in the suction system. Furthermore, one single outlet channel which branches off from the main air channel downstream of the first checkvalve and lets out into the atmosphere is provided with the checkvalve unit in question. A venturi pipe or a narrowing of the cross-section is provided in this outer-air channel. This narrowing of the cross-section is connected via a channel, hereinafter the venturi channel, to the main air channel at a point located upstream of the first checkvalve.

Such a checkvalve unit, hereinafter the valve unit, is described in U.S. Pat. No. 5,291,916; DE 43 44 624 A1 and DE 43 10 761 C2. In the known valve units, it is a disadvantage that air is constantly sucked in through the outer-air channel. This is especially detrimental with combustion engines where the air mass flowing through the choke valve of the air suction pipe is used for engine control or to optimize the combustion process. In a valve unit described in U.S. Pat. No. 3,754,841 the outer-air channel containing the venturi pipe can be closed off by a sliding valve when the system pressure of the operating system has reached its target value. The sliding valve is controlled by differential pressure. In addition, a membrane holding a plunger which actuates the sliding valve is subjected on the one hand to the system pressure and on the other hand to a reference pressure. To produce the reference pressure, a venturi pipe is installed in a second outer-air channel letting out into the atmosphere and connected to the suction pipe of the engine. A connecting channel branches off from the narrowing point of the venturi pipe and influences the above-mentioned membrane from one side. The second outer-air channel is permanently open, so that a stream of wrong air is constantly aspired by the suction pipe. Furthermore this valve unit can only be produced at high manufacturing and assembly costs.

OBJECTS AND SUMMARY OF THE INVENTION

Based on this, it is a principal object of the present invention to propose a valve unit which is simple in design and with which constant suction of outside air is prevented.

According to the present invention, a cut-off valve is installed before or after the narrowing of the cross-section of the venturi pipe in the single outer-air channel, said cut-off valve being actuated as a function of the system pressure prevailing in the operating system in such a manner that the connection to the atmosphere is opened when a predetermined target pressure is exceeded and is interrupted when this pressure is not reached. The connection to the outer air is thus open only when the system pressure exceeds a predetermined target pressure. As soon as the system pressure has dropped back to its target pressure, the outer-air channel is again shut off. An adulteration of the air mass flowing through the checkvalve is thereby substantially prevented. As a seat valve, the checkvalve is made with two defined switching positions, i.e. one open and one closed position. Such a valve is easy to produce and is also less prone to failure than a sliding valve, in which a suitably sized valve bore must be precisely made.

In an example of an embodiment of the invention, the shutoff valve is an electromagnetically actuated 2-way valve which is actuated by a control device which senses the system pressure by means of a pressure sensor. In this embodiment, it is first of all advantageous that the duration of the outer air arrival or of the open state of the outer-air channel can be kept very short thanks to the electrical control. Generally speaking, opening the outer-air channel with a valve unit according to the invention is only rarely needed, e.g. with repeated braking, after a long stoppage or with rpm ranges of the engine which are rarely reached. An additional advantage of the electrical controls consists in the fact that analog electrical signals for other electrical or electromechanical control functions can be utilized for the actual negative pressure in the braking force amplifier.

The shut-off valve may be a pneumatic shut-off valve which is actuated by the difference in pressure between the system pressure and the atmospheric pressure. Such a checkvalve unit is simple in design if for no other reason than that the pressure difference is not between the system pressure and a separately produced reference pressure, but that the reference pressure used is the atmospheric pressure. Advantageous embodiments of the valve unit are characterized in particular by simple and compact construction.

The invention is described in greater detail below through the examples of embodiments described in the drawings.

BRIEF DESCRIPTION OF THE DRAWINGS

FIG. 7 shows a cut section of another embodiment of a checkvalve unit, FIG. 8 shows a schematic cross-sectional view of another embodiment of a valve unit in a first operating state, FIG. 9 shows the valve unit of FIG. 8 in a second operating state and FIG. 10 is a diagram showing the dependence of the air mass flowing through the outside-air channel on the pressure in the suction pipe.

FIG. 11 is a diagram of volume flow Q through the outside air channel particularly illustrating the volume flow when $P_{SOLL}$ has been reached.

DETAILED DESCRIPTION

Figure 1:
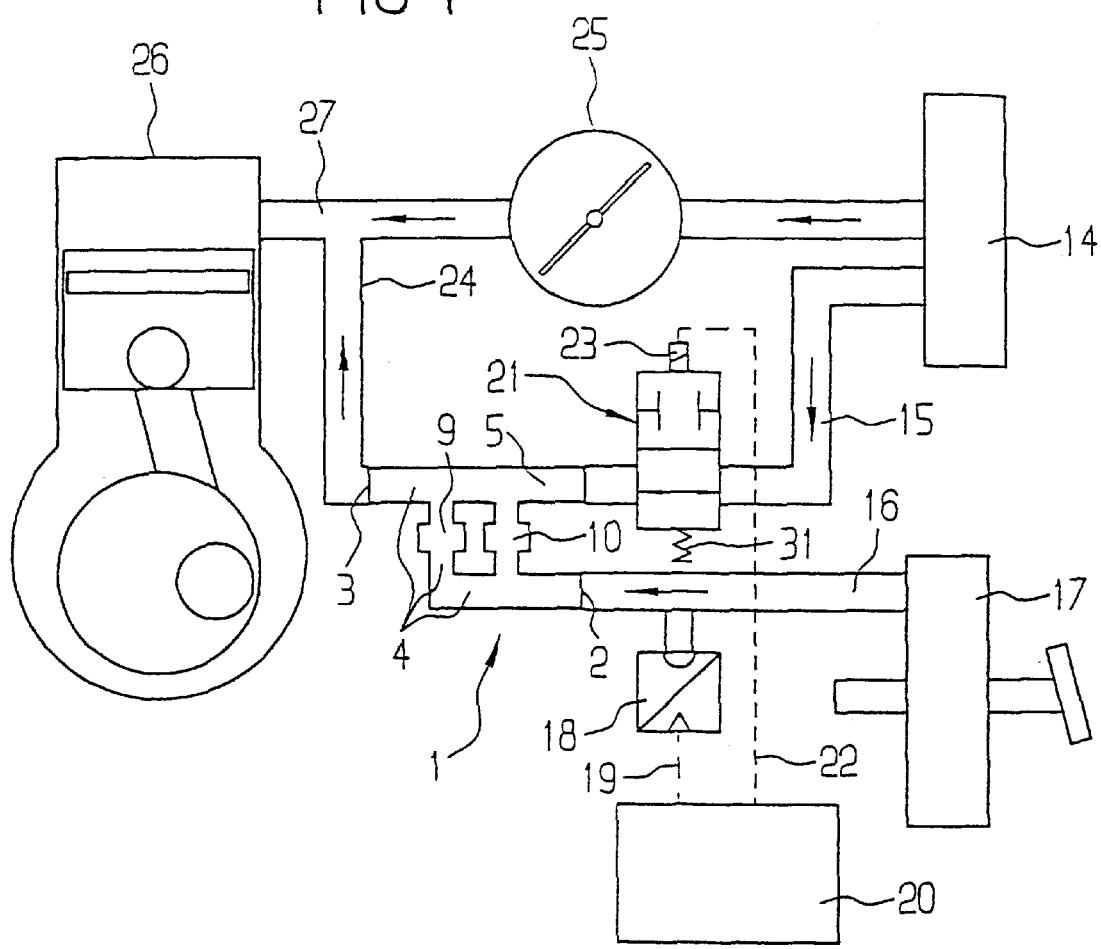
FIG. 1. is a functional diagram showing the utilization of a checkvalve unit with electromagnetic shut-off valve in a motor vehicle braking system.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment can be used on another embodiment to yield a still further embodiment. It is intended that the present application include such modifications and variations.

Figure 2:
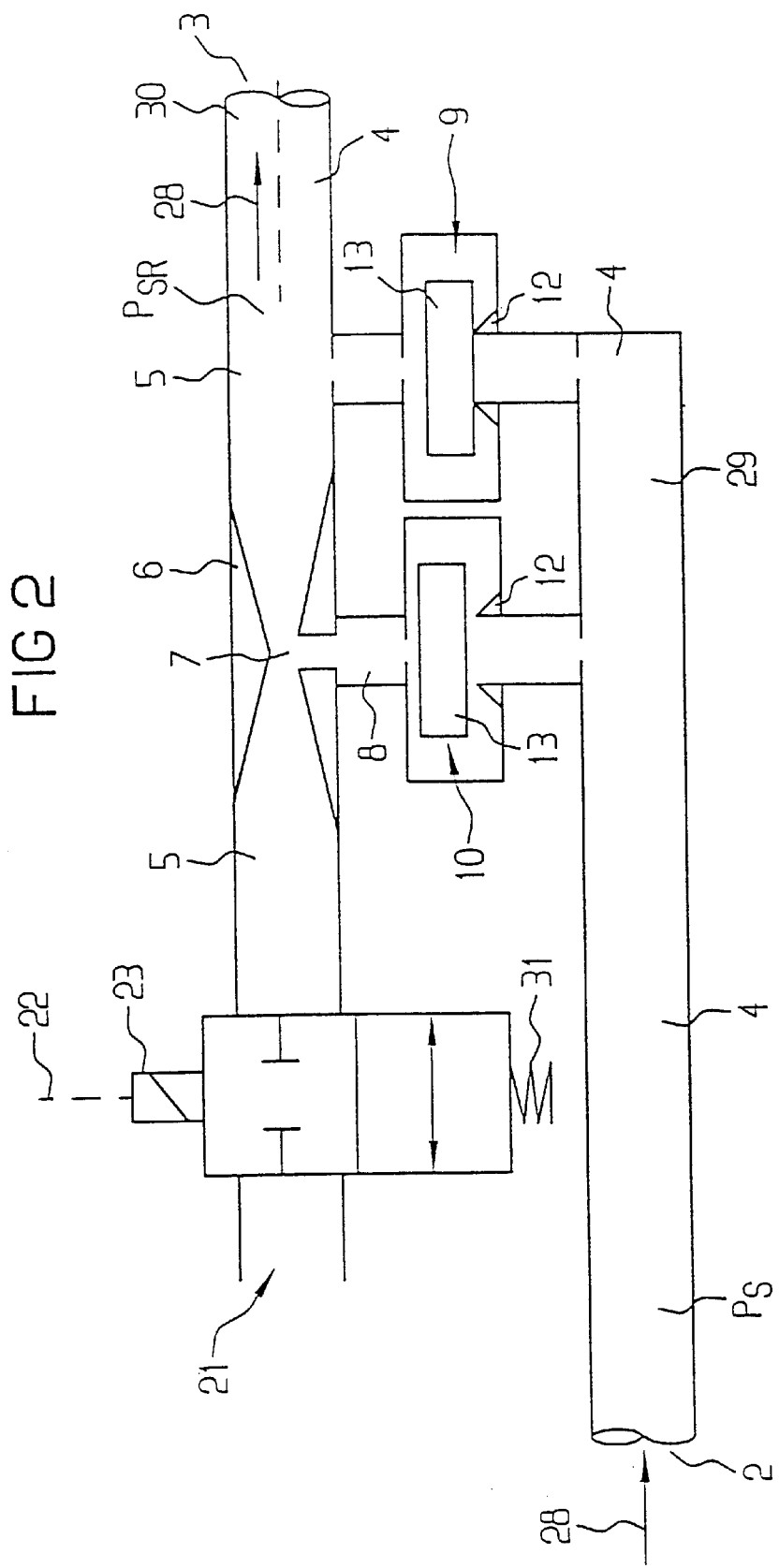
FIG. 2 shows the checkvalve unit of FIG. 1, but without the electromagnetically actuated shut-off valve.

As can be seen in FIGS. 1 and 2, a checkvalve unit according to the invention (hereinafter valve unit 1 for short) comprises an inlet 2, an outlet 3, a main air channel 4, an outside-air channel 5, a venturi pipe 6 located in the outside-air channel with a cross-sectional narrowing 7 which is normally found in a venturi pipe, a venturi channel 8 connecting the cross-sectional narrowing 7 to the main air channel 4 as well as a first checkvalve 9 and a second checkvalve 10. The first checkvalve 9 is located in the main air channel 4. Downstream of the first checkvalve 9, the outside-air channel 5 letting out into the atmosphere branches off from the main air channel. The venturi channel 8 lets out upstream of the first checkvalve 9 into the main air channel and contains a second valve 10. The checkvalves 9,10 are plate valves and each comprises accordingly a ring-shaped valve seat 12 and a valve plate 13 interacting with it. A pneumatically actuated 2-way valve is intercalated in the outside-air channel. The outside-air channel in the application shown in FIG. 1 is connected to the air filter 14 of the air suction system of a vehicle via a circuit 15. The inlet 2 of the valve unit 1 is connected via a circuit 16 to the braking force amplifier 17 of the auxiliary braking system of the vehicle. A pressure sensor 18 is connected to the circuit 16 and is connected via a control circuit 19 to an electrical or electronic control device 20. The control device produces a setting signal which is retransmitted via a control circuit 22 to the solenoids 23 of the 2-way valve 21. The outlet 3 of the valve unit 1 is connected via a circuit 24 downstream of the throttle valve 25 to the suction channel 27 leading to the combustion chamber of an engine 26. The throttle valve 25 is thus subjected to air flow from the circuit 15, the outside-air channel 5, the main air channel 4 and the circuit 24, in the manner of a bypass. A constant air flow through this bypass is however prevented by the shut-off valve 21.

The valve unit shown in FIGS. 1 and 2 functions as follows: Only two defined operating states are provided with the proposed valve unit. In one operating state, the 2-way valve 21 is closed, in the other operating state it is open. In FIG. 2 a situation is shown in which the 2-way valve 21 is closed. Starting from a situation where the pressure is balanced, e.g. after a long stoppage of the vehicle, air is sucked from the braking force amplifier 17 in direction of flow, mainly via the checkvalve 9 as the engine is switched on. The 2-way valve is open as shown in FIG. 1. Thereby outside air is sucked in through the venturi pipe 6. The air flowing through the outside-air channel is accelerated with the increased narrowing of the venturi pipe 6, and this causes pressure to drop. At the narrowest point of the venturi pipe, the cross-sectional narrowing 7, the speed of flow is the greatest and therefor the pressure of the air sucked in is correspondingly lowest. After the cross-sectional narrowing 7, the speed of flow is again reduced and the pressure rises accordingly. In the segment 29 located upstream before the checkvalve 9, the system pressure which is equal to the system pressure $p_s$ is lower -than the suction pipe pressure $P_{SR}$ in the segment 30 of the main air channel 4 extending away from the venturi pipe 6. Due to these pressure relations, the valve plate 13 of the checkvalve 9 is pressed against its valve seat 12 as the air flow lets up. The main air channel is thus closed off, and the air sucked from the braking force amplifier 17 is thereby sucked away via the venturi channel 8, at least towards the end of the evacuation process. When the system pressure $p_s$ has dropped to a target value $P_{soll}$, the control unit 20 actuates the solenoid 23 of the two-way valve 21 and moves it into its second valve position, in which it closes off the outside-air channel 5. If the system pressure $P_S$ rises, e.g. because of multiple braking, the power flow to the solenoid 23 of the two-way valve is interrupted and the valve 21 is moved by a spring 32 into its open switch position. Outside air is then again sucked in through the venturi pipe 6, causing its negative pressure amplification to become active.

The pressure and flow conditions are shown in form of two diagrams in FIGS. 10 and 11 for clarification. In the diagram of FIG. 10, the system pressure $P_S$ is shown over the suction pipe pressure $P_{SR}$ It can be seen that a continuous drop of $P_S$ takes place up to the pre-set target pressure $P_{soll}$. The drop in the system pressure $P_S$ is however greater than the drop of the pressure $P_{SR}$ because of the negative-pressure amplification through the venturi pipe. When $P_{soll}$ has been reached, the outside-air channel is closed off, the two checkvalves 9,10 are closed, because the pressure in segment 30 of the main air channel 4 is greater than $P_S$. Only when the pressure $P_{SR}$ becomes greater than $P_{Soll}$, does further evacuation of the braking force amplifier 17 take place. FIG. 11 shows how the volume flow Q through the outside-air channel 5 stops suddenly when $P_{Soll}$ has been reached.

Figure 3:
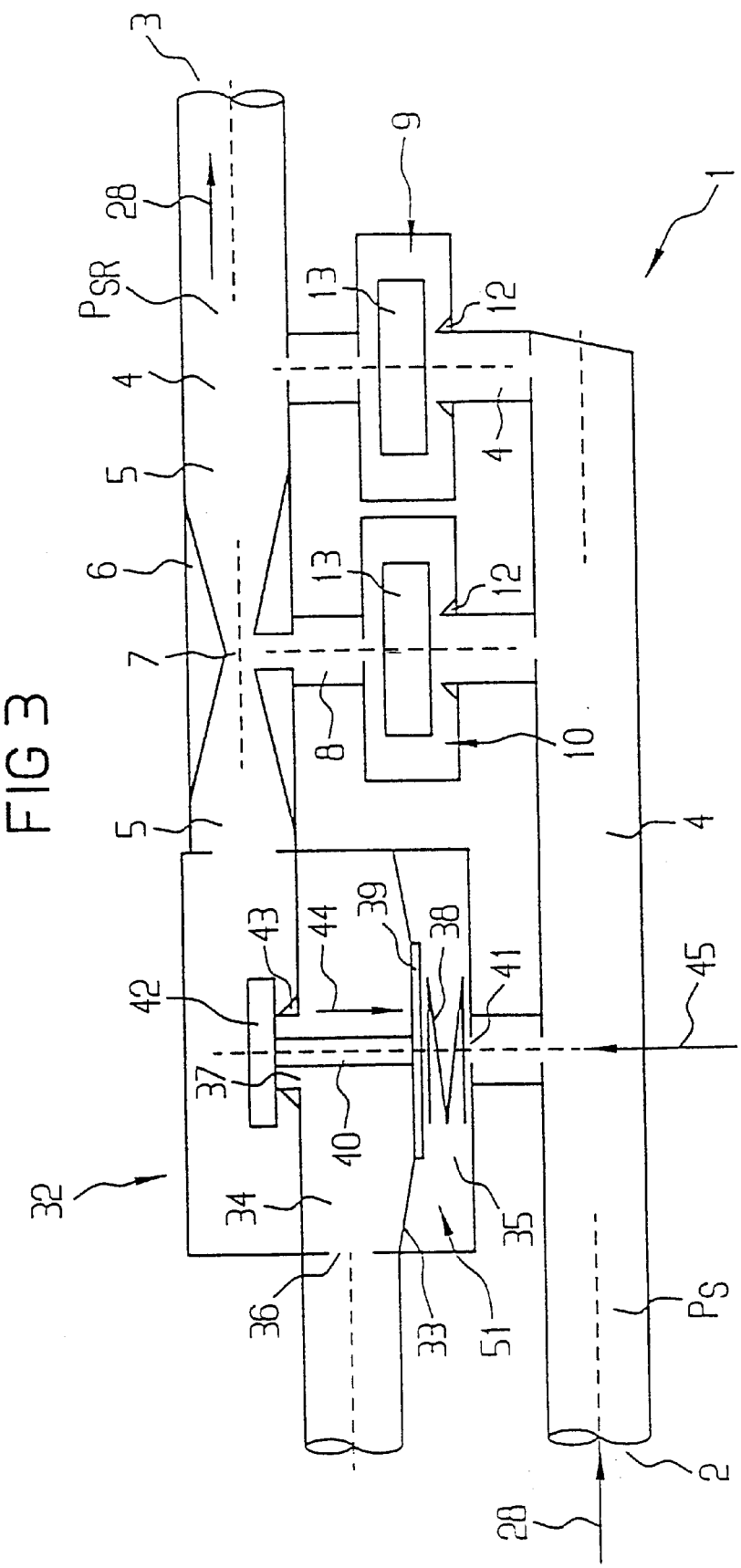
FIG. 3 is a schematic sectional representation of an embodiment with pneumatically controlled shut-off valve in a first operating state.

In the valve unit shown in FIG. 3, the outside-air channel 5 is closed off by a directional seat valve 32 actuated by a pressure difference between the system pressure $P_S$ and the atmospheric pressure. This directional seat valve 32 comprises a valve chamber 51 which is subdivided by a membrane 33 into an atmosphere chamber 34 and a negative-pressure chamber 35. The atmosphere chamber is connected on the one side to the atmosphere through an inlet opening 36, and on the other side to the outside-air channel 5 through an outlet opening 37. The negative-pressure chamber 35 has a connection opening 41 through which it is connected to the main air channel at a point upstream of the checkvalve 10. The negative-pressure chamber 35 contains a helical spring 38 which bears on the one side against the housing wall of the negative-pressure chamber and on the other side on the membrane 33. The membrane 33 has a central reinforced area 39 supporting a valve plunger 40 which protrudes essentially at a right angle to the plane surface of the reinforced area and reaches through the connection opening. The free end of the valve plunger 40 widens radially and is made in form of a valve plate 42. This valve plate 42 interacts with a valve seat 43 surrounding the connection opening 37 outside the atmosphere chamber 34 in form of a ring.

Figure 4:
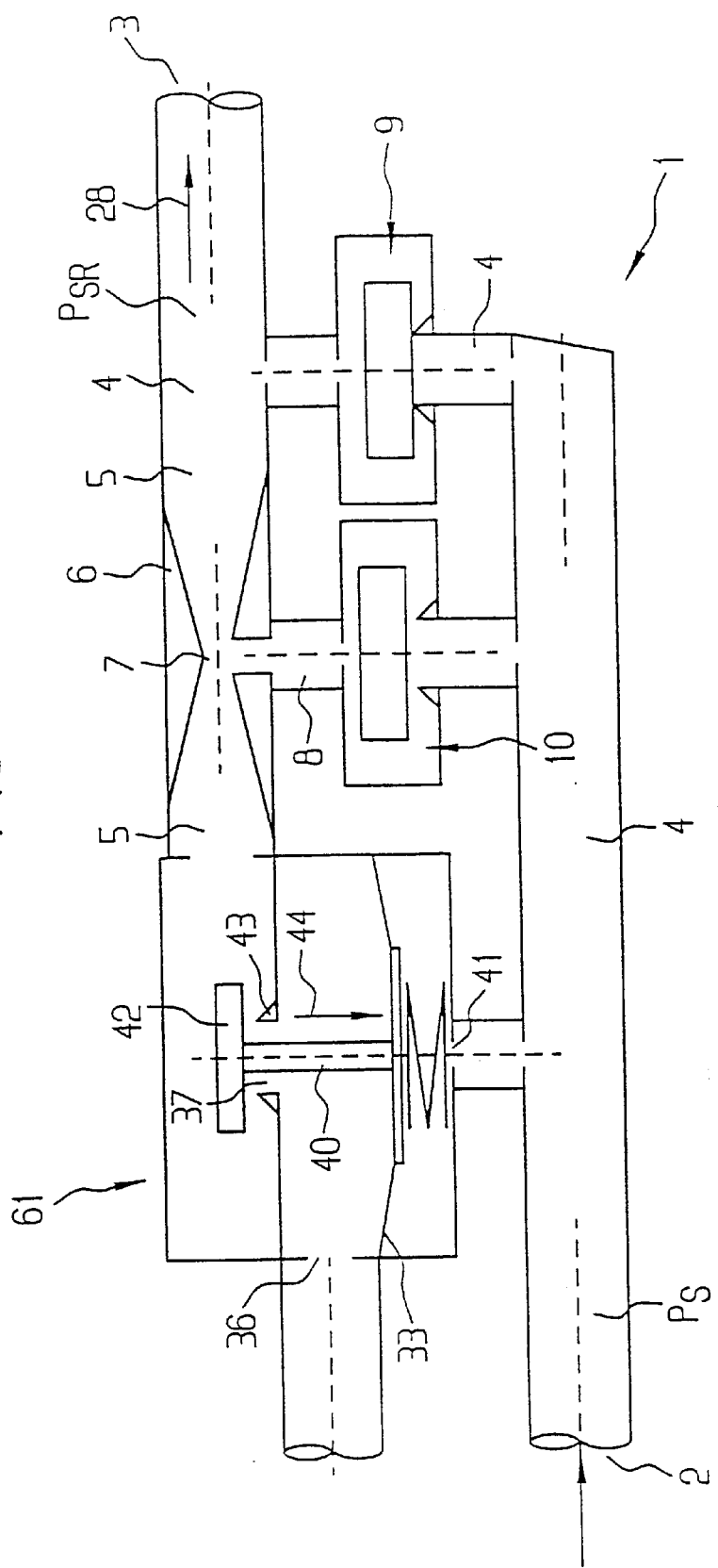
FIG. 4 shows the checkvalve unit of FIG. 3 in a second operating state,.

A system pressure $P_S$ prevails in the negative-pressure chamber 35, while the atmospheric pressure prevails on the other side of the membrane, in the atmosphere chamber 34. The helical spring 38 is designed so that it exerts a force upon the membrane 39, said force being slightly less than the force exerted in closing direction 44 due to the pressure difference over the membrane. When the braking force amplifier reaches the target system pressure $P_{Soll}$, the valve plunger 40 is pushed in closing direction and the valve plate 42 is accordingly pressed against the valve seat 43. The connection to the outside air is then closed off. When, e.g. due to braking occurrences succeeding each other in rapid sequence, the pressure $P_S$ in the braking force amplifier rises to such an extent that the pressure difference at the membrane 33 is equal to or smaller than the force exerted by the helical spring 38, the membrane, and accordingly the valve plunger 40, moves in opening direction 45. The state shown in FIG. 4 is then reached. The valve plate 42 is lifted from the valve seat 43 and atmospheric air can be sucked in through the inlet opening 36 and the outlet opening 37 via the venturi pipe 6 in flow direction 28. In the cross-sectional narrowing 7 of the venturi pipe or in the venturi channel 8 following it, a pressure drop occurs. Upstream of the venturi pipe 6 on the other hand, the suction pipe pressure $P_{SR}$ substantially prevails again. Due to this pressure difference, the checkvalve 9 closes. The air sucked from the braking force amplifier goes therefore through the venturi channel 8. When the target system pressure $P_S$ has again been reached, the pressure conditions over the membrane 33 are again such that the valve plunger 40 moves in closing direction 44 and the outlet opening 37 is closed.

Figure 5:
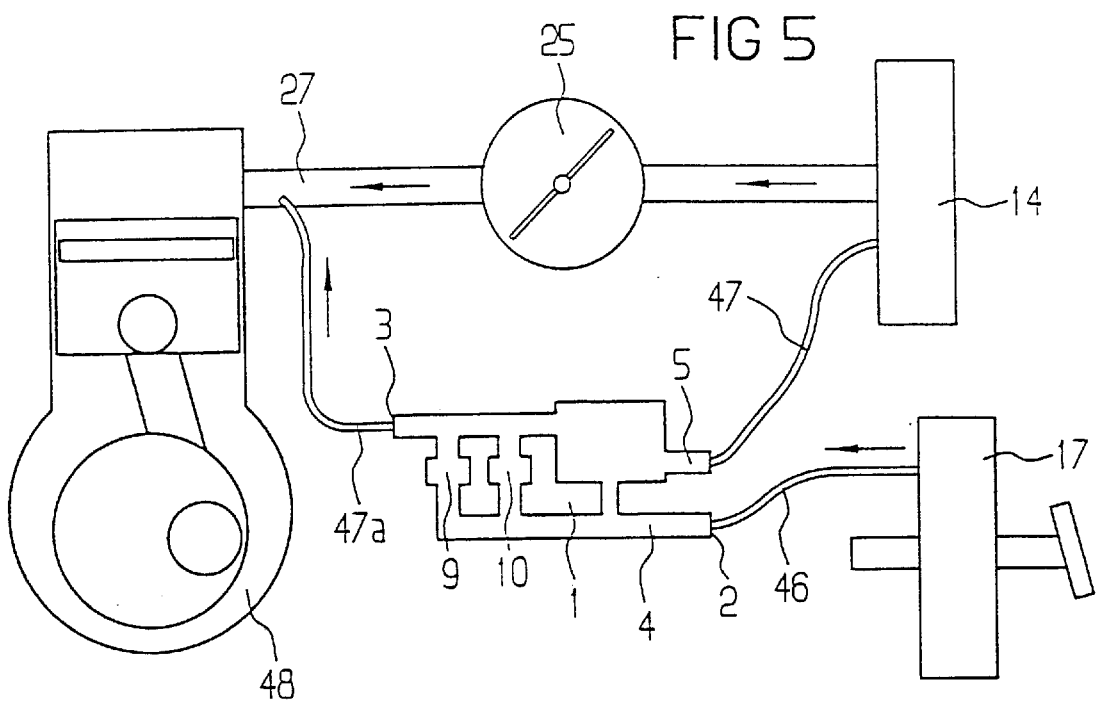
FIG. 5 shows the auxiliary braking system of a vehicle with a checkvalve unit as in FIGS. 3 and 4.
Figure 6:
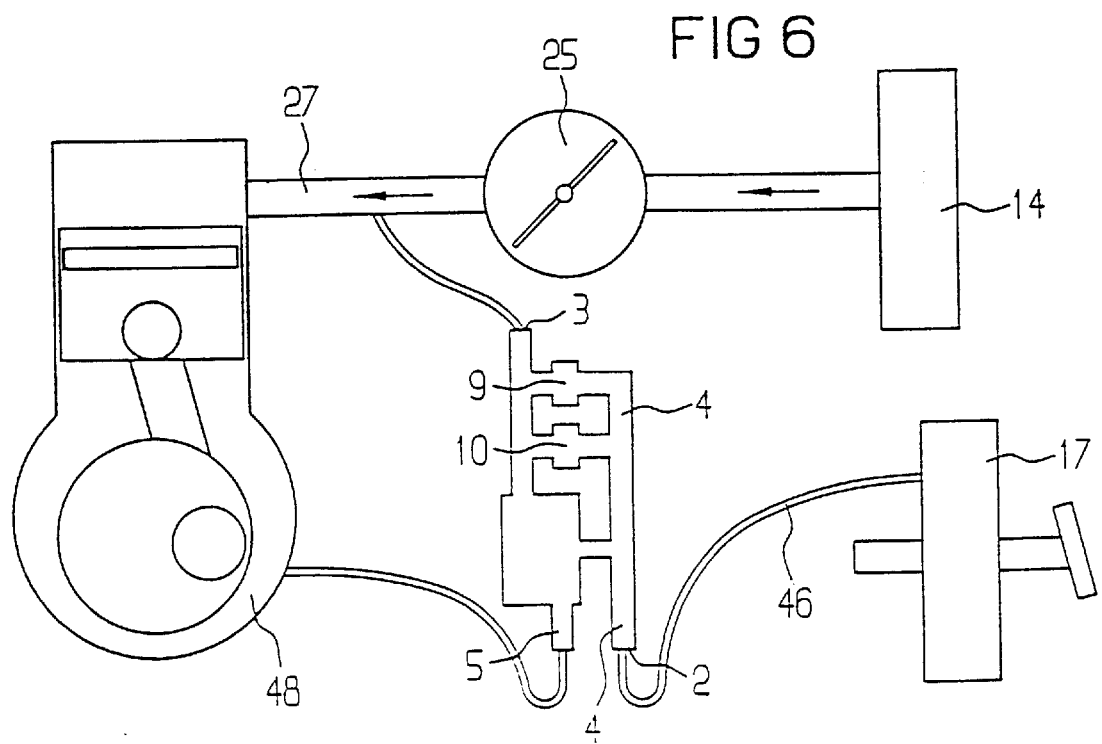
FIG. 6 shows a braking system according to FIG. 5, but with the checkvalve unit connected in a different manner.

FIG. 5 is an installation example for the valve unit described above. The main air channel 4 of the valve unit 1 is connected via a circuit 46 to the braking force amplifier 17. The inlet opening 36 is connected via a circuit 47 to the air filter 14. And to outlet 3 finally, a circuit 47a is connected which lets out into the suction channel 27 downstream of the throttle valve 25. The arrangement of FIG. 6 differs from that of FIG. 5 in that the outside-air channel 5 is not connected to the air filter but to the crank housing 48 of the engine.

In the embodiment shown in FIG. 7, a valve chamber 51 is also present, and is subdivided by a membrane 33a into an atmosphere chamber 34a and into a negative-pressure chamber 35a. The membrane 33a has a central, reinforced area 39a. The outside-air channel 5 lets out via a first inlet opening 49 into the atmosphere chamber and emerges again via a first outlet opening 50. A valve plunger 40a protrudes essentially at a right angle from the flat side of the membrane 33a or the reinforced area 39a towards the atmosphere chamber 34a and reaches through the first outlet opening 50 while its free end radially widens into a valve plate 42a. The valve plate 42a interacts with a valve seat 43a which surrounds the first outlet opening in form of a ring. A helical spring 38a is installed in the negative-pressure chamber 35a and presses the membrane 33a in the opening direction 45. The main air channel 4 lets out into the negative-pressure chamber 35a via a second inlet opening 52 and emerges again via a second outlet opening 53. Finally the venturi channel 8 lets out via a third outlet opening 54 into the negative-pressure chamber 35a.

From the flat side of the reinforced area 39a towards the negative-pressure chamber 35a, a second valve plunger 40b extends essentially at a right angle, its free end widening radially and forming a valve plate 42b. This valve plate interacts with a valve seat 43b surrounding the third outlet opening 54 in form of a ring on the inside of the negative-pressure chamber 35a. The valve plate 42b and the valve seat 43b constitute the second checkvalve 10a which is also present in the previously described examples of embodiments and which serves to shut off the venturi channel 8 against the main air channel 4. The second outlet opening 53 of the negative-pressure chamber 35a is surrounded on the outside by a valve seat 55 in the form of a ring which interacts with a valve plate 55a located outside the negative-pressure chamber 35a. The valve plate 55a and the valve seat 55 together constitute the first checkvalve 9a which is also present in the previous examples of embodiments and is intercalated in the main air channel 4. As seen in flow direction 28, the outside-air channel 5 lets out into the main air channel 4 before this valve. In the segment of the main air channel 4 following the second inlet opening 52 against the flow direction 28, another checkvalve 56 is installed which comprises a valve seat 56a and a valve plate 56b interacting with same.

The valve unit 1 according to FIG. 7 operates as follows: With the vehicle engine shut off, extensive pressure equalization takes place in the course of the stoppage phase inside the valve unit. Only in the braking force amplifier itself some negative pressure locked in by the checkvalve 56 may still be present. Since the pressure conditions over the membrane 33a are balanced out, the membrane is moved by the helical screw 38a into opening position, i.e. the first outlet opening 50 and the third outlet opening 54 are open. If the engine is then started, a negative pressure pSR builds up in the suction channel 27. Because of the cross-sectional narrowing 7 in the venturi pipe 6 and the flow resistance connected with this, the main air mass is sucked away through the main air channel 4. The checkvalves 56 and 9a located therein are open. A partial air stream is however also sucked in through the outside-air channel 5. As the system pressure pS decreases, the force exerted upon the membrane 33a increases due to the pressure difference between the system pressure and the atmospheric pressure. The spring, as described earlier, is designed so that the membrane is moved in closing direction 44 at a predetermined target system pressure pSoll. When the target system pressure has been reached, the outside-air channel 5 is closed. This also applies to the venturi channel. An air flow in the main air channel only takes place under such conditions if the suction pipe pressure pSR drops below the target system pressure.

The valve unit 1 shown in FIG. 8 has a particularly compact design. All components are placed in a common housing 60 which encloses a valve chamber 51a. The valve chamber is subdivided by two separating partitions into an atmosphere chamber 34b, a negative-pressure chamber 35b and a suction chamber 57. The atmosphere chamber 34b is connected via an atmosphere opening 58 to the outside air. The separating partition located between the atmosphere chamber 34b and the negative-pressure chamber 35b is a membrane 33b with a central reinforced area 39b. The separating partition 62 between the negative-pressure chamber 35b and the suction chamber 57 has a passage opening 63. A valve plunger 59 in the form of a venturi pipe 6 extends essentially at a right angle from the side of the reinforced membrane area 39b away from the negative-pressure chamber 35b. The valve plunger 59 reaches through the passage opening 63. A movable sealing membrane 64 is provided between the outside circumference and the opening edge of the passage opening 63. This membrane hermetically seals off the negative-pressure chamber 35b from the suction chamber 57. A helical spring 38b is located in the negative-pressure chamber 35b and bears on the one side upon the separating partition 62 and on the other side on the reinforced membrane area 39b and surrounds the valve plunger 59 at a radial distance. The venturi channel 8 extends essentially radially to the valve plunger 59 and lets out on the one side into the cross-sectional narrowing 7 and on the other side into the negative-pressure chamber 35b. The second check valve 10b is located in the venturi channel. It is fixed on the circumferential surface of the valve plunger 59 together with a valve housing 65.

The free end of the valve plunger 59 is radially widened and formed into a valve plate 66. The valve plate 66 interacts with a valve seat 69 located on the housing wall 67 across from the separating partition 62. In addition to the passage opening 63, a connecting opening 68 is also present in the separating partition 62 and is surrounded in the form of a ring by a valve seat 69 located on the suction chamber side of the separating partition 62. A valve plate 70 interacts with the valve seat 69. The valve seat 70 and the valve seat 69 constitute the first checkvalve 9b located in the main air channel 4. The main channel 4 is constituted in the present case by the negative-pressure chamber 35b and the suction chamber 57. An inlet 2 is located at the beginning of the main air channel 4, and the outlet 3 forms its end. The outside-air channel 5 on the other hand is constituted by the atmosphere chamber 34b and the interior space of the valve plunger 59, i.e. by the venturi pipe 6. The shut-off valve closing the outside-air channel 5 is formed by the valve plate 66 and the valve seat 69.

The manner in which the valve unit according to FIG. 8 operates, starting from a pressure-balanced state, such as with a long engine stoppage, is described as follows: At first the valve plunger 59.is in its open position as shown in FIG. 9. Following the starting of the engine, the suction pipe pressure pSR builds up in the suction chamber 57, producing a main air stream through the first checkvalve 9b in the main air channel 4 and an accessory air stream through the venturi pipe 6. Based on the venturi principle, a pressure drop then occurs between the cross-sectional narrowing 7 of the venturi pipe 6 and the negative-pressure chamber 35b, causing a pressure drop going beyond the pressure produced by the suction channel of the engine. Accordingly the first checkvalve 9b closes, so that an evacuation takes place exclusively through the second checkvalve 10b, the venturi channel 8 and the suction chamber 57. With increasing evacuation, the pressure difference at the membrane 33b increases until finally a state is reached in which the force exerted in closing direction 44 upon the membrane 33b is greater than the spring force of the helicoidal spring 38b. As a result the valve plunger 59 is moved into its closed position shown in FIG. 8. A volume flow can then only take place when the pressure pSR in the suction chamber becomes greater than the target pressure pS.

It should be apparent to those skilled in the art that various modifications and variations can be made in the present invention without departing from the scope and spirit of the invention. It is intended that the present invention includes such modifications and variations as come within the scope of the appended claims and their equivalents.

What is claimed is:

1. A check valve apparatus for maintaining negative pressure in an operating system, said check valve comprising:

an inlet connectable to an operating system requiring a negative pressure, and an outlet connectable to a system producing a negative pressure;

a main air channel establishing an air flow path between said inlet and said outlet;

a first check valve disposed in said main air channel;

an outside air channel having one end in communication with said main air channel at a location downstream of said first check valve in a direction of air flow through said main air channel to said outlet, said outside air channel in communication with atmospheric pressure at an opposite end thereof;

a cross-sectional narrowing defined in said outside air channel with a venturi channel disposed between said cross-sectional narrowing and said main air channel;

a second check valve disposed in communication between said main air channel and said cross-sectional narrowing;

an automatic shut off valve disposed in said outside air channel to alternately isolate and open said outside air channel to atmospheric pressure as a function of system pressure in the operating system; and a sensor disposed to sense operating system pressure and a control device in communication with said sensor and said shut off valve to control said shut valve in response to sensed operating system pressure.

2. The apparatus as in claim 1, wherein said shut off valve comprises an electromagnetically operated valve controlled by a signal from said control device.

3. The apparatus as in claim 2, wherein said shut off valve comprises a two way solenoid valve.

4. The apparatus as in claim 1, wherein said shut off valve is disposed upstream of said cross-sectional narrowing in said outside air channel.

5. The apparatus as in claim 1, wherein said second check valve is disposed in said venturi channel.

* * * * *